United States Patent [19]

Polinsky et al.

[11] Patent Number: 5,529,400
[45] Date of Patent: Jun. 25, 1996

[54] THRUST BEARING MAGNET HOLDER

[75] Inventors: Mark A. Polinsky; Michael B. Basmajian, both of Torrington, Conn.

[73] Assignee: The Torrington Company, Torrington, Conn.

[21] Appl. No.: 489,604

[22] Filed: Jun. 12, 1995

[51] Int. Cl.[6] ................................................. F16C 19/30
[52] U.S. Cl. ...................... 384/446; 384/448; 384/620
[58] Field of Search ........................... 384/446, 448, 384/618, 620, 617, 609

[56] References Cited

U.S. PATENT DOCUMENTS

| | | | |
|---|---|---|---|
| 4,259,637 | 3/1981 | Bloomfield et al. | 324/166 |
| 4,732,494 | 3/1988 | Guers et al. | 384/448 |
| 4,850,722 | 7/1989 | Bayer | 384/448 |
| 4,865,468 | 9/1989 | Kato et al. | 384/448 |
| 4,875,785 | 10/1989 | Santos et al. | 384/448 |
| 4,883,374 | 11/1989 | Rhoads et al. | 384/618 |
| 4,915,199 | 4/1990 | Hayashi | 188/181 |
| 4,915,512 | 4/1990 | Hilby et al. | 384/446 |
| 4,938,612 | 7/1990 | Yamada | 384/446 |
| 5,004,358 | 4/1991 | Varvello et al. | 384/446 |
| 5,011,303 | 4/1991 | Caron | 384/446 |

*Primary Examiner*—Lenard A. Footland
*Attorney, Agent, or Firm*—John C. Bigler

[57] ABSTRACT

A plastic magnet holder is constructed for use with an annular thrust bearing. The plastic magnet holder has an annular plastic magnet which was snapped into the plastic magnet holder. The plastic magnet holder is provided with a recess formed by a surface having a size and shape to permit the plastic magnet holder to be snapped over the annular thrust bearing.

2 Claims, 2 Drawing Sheets

5,529,400

THRUST BEARING MAGNET HOLDER

BACKGROUND OF THE INVENTION

This invention relates to thrust bearings. More particularly, this invention is a magnet holder for use with an annular thrust bearing which uses a magnetic field source to be detected by a magnetic field sensor, for example for determining the rotational speed of a rotating thrust race with respect to an opposed fixed thrust race.

Current electronic speed sensors consist of two independent components whose sole purpose is to sense speed. Typically, a magnetic field source is pressed onto a especially prepared shaft and a sensor is positioned with respect to a magnetic field source. Many manufacturers of mechanical and electrical systems apportion only a very limited axial and radial space for thrust bearings.

It is extremely important that the thrust bearings and the magnetic field source are very compact and take up very little space, especially in the axial direction, yet function properly, require minimum or no adjustment of the magnetic field source and magnetic field sensor at installation and not lose pilot upon axial movement of one thrust race with respect to the other thrust race.

In addition to the requirement by manufacturers that the components be very compact and take up very little space, manufacturers also require that there be fewer changes and the costs be lower than systems provided in the past. Previously, when a customer required a thrust bearing speed sensor a special extended race had to be tooled and produced to provide room for magnet attachment. Often a custom bearing had to be constructed to accompany the new race replacing the original production bearing or bearing assembly.

This invention provides a means of attaching a magnet to existing thrust bearing assemblies. Thus, the customer, if desired, need only buy the plastic magnet holder of this invention and attach the magnet holder to existing thrust bearing assemblies. This, of course, eliminates the additional costs of building a specially extended race and other required construction to provide room for magnet attachment. Of course, if the customer so desires, the customer may buy the combination of the ring and the magnet holder. The sizes and shapes of the magnet holder and annular thrust bearing are very compact and take up very little space, especially in the axial direction, and yet function properly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a magnet holder made of plastic. An annular plastic magnet is mounted in the plastic magnet holder. The plastic magnet holder has a recess formed by surfaces configured to permit the plastic magnet holder to be snapped over an annular thrust bearing.

In another aspect of the invention, a new combination of an annular thrust bearing and an annular plastic magnet holder is provided. The magnet holder has a recess of a predetermined configuration. The size and shape of the recess is substantially the same as the size and shape of the annular thrust bearing. The recess and the annular thrust bearing outside surface are configured to permit the plastic magnet holder to be snapped over the annular thrust bearing.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various figures, like parts are referred to by like numbers.

Figure 1:
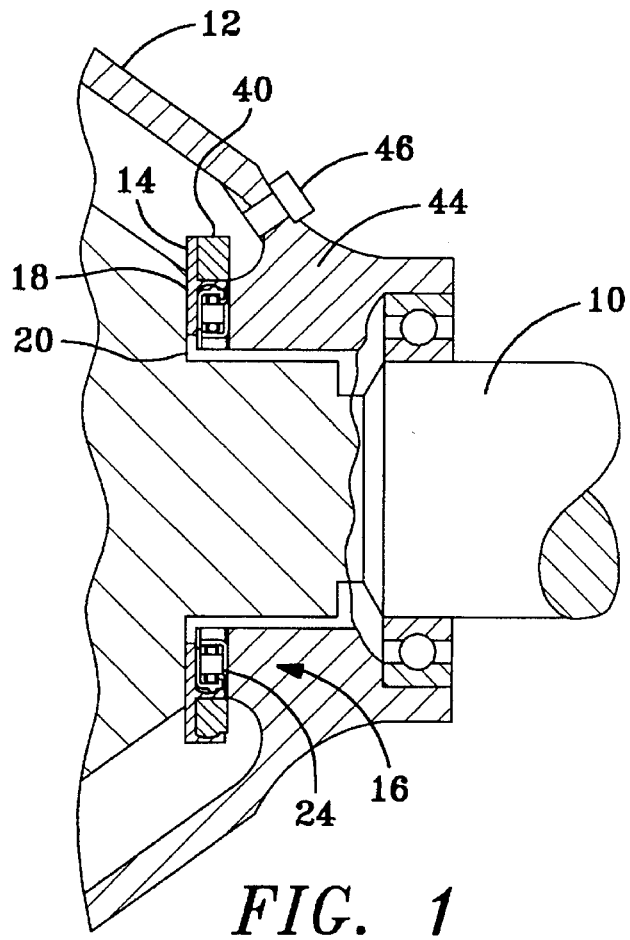
FIG. 1 is a fragmentary view of an automobile transmission output with the thrust bearing and magnet holder installed in the transmission.
Figure 3:
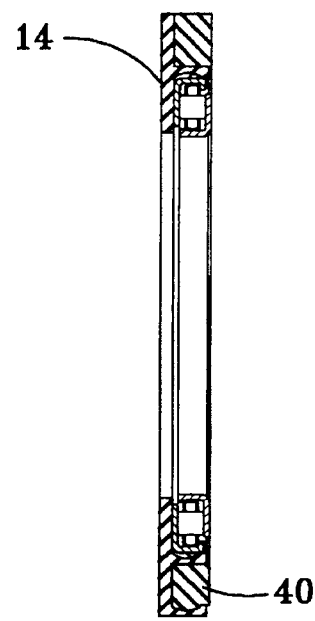
FIG. 3 is a sectional view taken along lines 3—3 of FIG. 2 and in the direction of the arrows.

Referring to the drawings, and more particularly to FIG. 1, a rotatable shaft 10 is located within the stationary housing 12. The plastic magnet holder 14, containing the annular thrust bearing 16 is shown mounted within the stationary housing 12. The plastic magnet holder has an annular radially inwardly extending spacer 18. The backside of the radially extending annular spacer 18 is in contact with the radially extending surface 20 of the shaft 10. Magnet holder 14 rotates at the same speed as the shaft 10.

Figure 4:
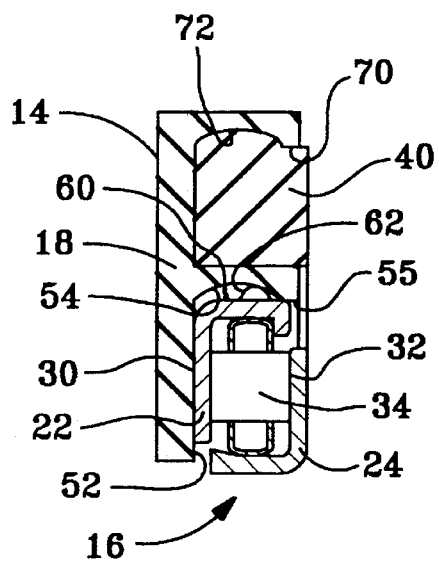
FIG. 4 is a partial side sectional view in elevation showing the thrust bearing mounted within the magnet holder.

Referring to FIG. 1 and FIG. 4, the annular thrust bearing 16 has a first thrust race having a radially extending annular portion 22. A second thrust race has a radially extending annular portion 24 axially separated from the radially extending annular portion 22 of the first thrust race. The radially extending annular portions are provided with opposed radially extending annular raceways 30 and 32. Rolling members 34 are adapted to roll on the raceways 30 and 32.

Figure 5:
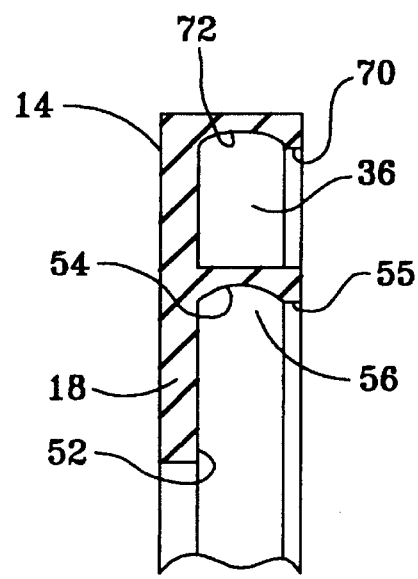
FIG. 5 is a partial side sectional view in elevation of the magnet holder.
Figure 2:
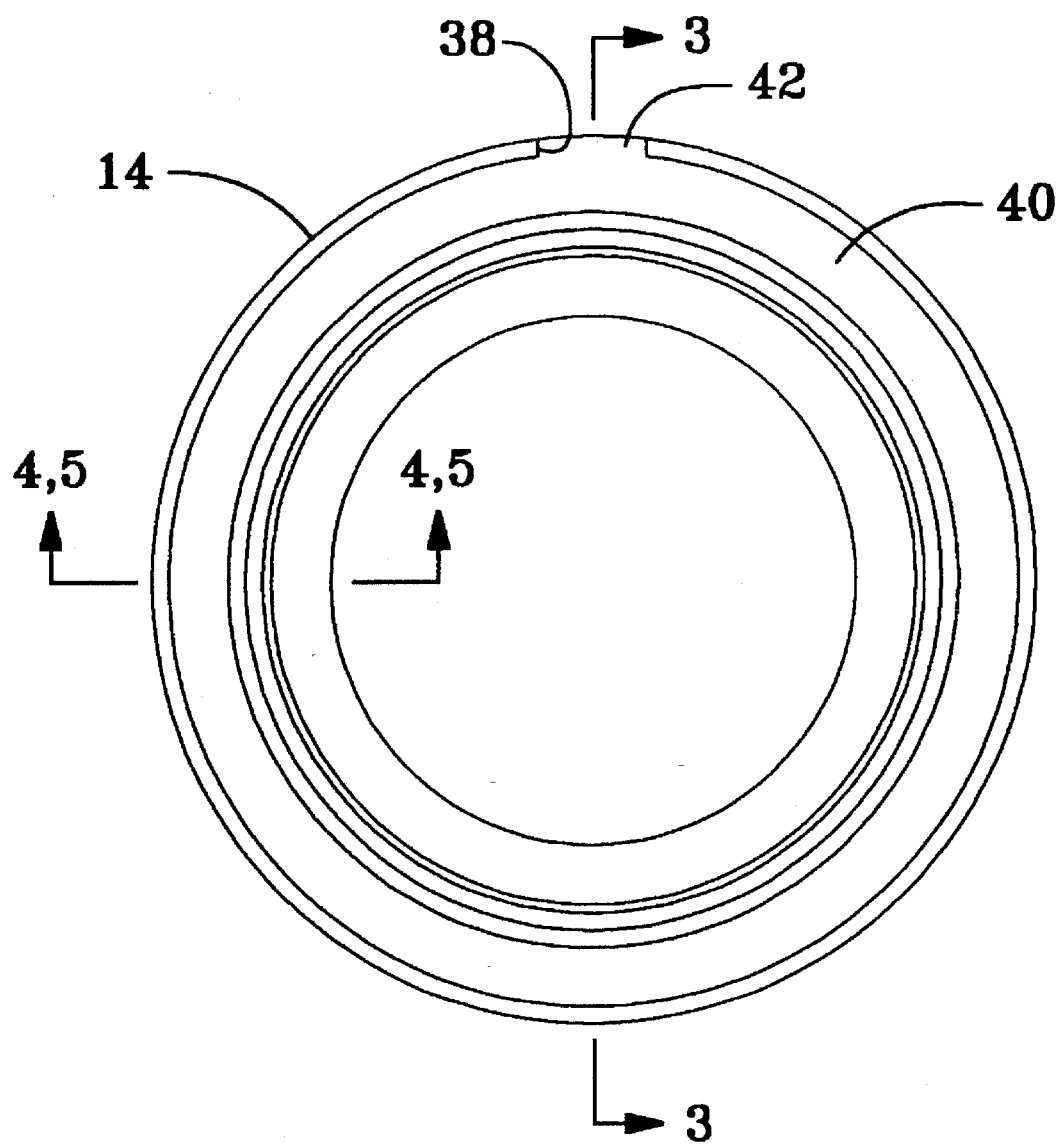
FIG. 2 is a front view of the magnet holder.

The annular plastic magnet holder 14 has an annular groove 36 (See FIG. 5). A slot 38 (See FIG. 2) extends radially outwardly from the annular groove 36. An annular plastic magnet 40 is located within the annular groove 36. The magnet has an anti-rotation tab 42 (See FIG. 2) extending into the slot 38.

Referring to FIG. 1, the second thrust race is mounted on the back plate 44 of housing 12. A magnetic field sensor, such as a Hall sensor 46, directly faces the annular plastic magnet 40. The plastic magnet 40 contains an appropriate amount of metal filings or other material adapted to produce a magnetic field. The sensor 46 senses the number of times the alternate North and South magnetic poles of the annular magnet 40 passes by the sensor thus indicating the speed at which the shaft 10 is rotating.

The annular groove and slot, and the annular magnet with its anti-rotation tab are configured to permit the magnet to be snapped into the plastic magnet holder and prevent axial and rotational movement of the magnet with respect to the plastic magnet holder. Referring to FIG. 4 and FIG. 5, the spacer 18 of the magnet holder 14 overlaps and contacts the backside of the radially extending annular portion 22 of the first thrust race. The front radially extending surface 52 of the spacer 18, along with the annular concave surface 54 and annular lip 55 of the magnet holder provide a recess 56 extending from the front side of the annular plastic magnet holder to the spacer 18. The axial length of the recess is substantially the same as the axial length of the thrust bearing 16. The size and shape of the recess 56 and the size and shape of the thrust bearing 16 are substantially the same and configured to permit the plastic magnet holder 14 to be snapped over the thrust bearing 16.

Referring to FIG. 4 an annular band 60 which has an annular protrusion 62 is affixed to the first thrust race. The radially inwardly extending lip 55 cooperates with the annular protrusion 62 on the thrust bearing to insure that the assembly of the magnet holder and thrust bearing is held together in one unitary piece. The plastic of the magnet holder is of the type of material such that the annular protrusion 60 can be snapped past the lip 55.

The groove 36 of the magnet holder 14 includes the radially inwardly extending lip 70 an the annular concave surface 72. The magnet 40 is provided with an annular protrusion 72 which fits into the annular concave surface 70 of the magnet holder 14 when the magnet 40 is snapped into the magnet holder 14.

The magnet and the magnet holder are molded from similar plastics. Therefore they will not act differently with changes in temperature.

In the embodiment shown the groove for the magnet and the recess for the thrust bearing are located on the same side of the magnet holder. This is because of the location of the Hall sensor 46 with respect to the thrust bearing 16. In some cases the sensor 46 may be located on the housing 12 in a position such that the magnet must be located in a groove formed in the backside of the magnet holder 14 so that the magnet 40 will face the sensor 46. The structure of the groove, however, will be substantially the same as the structure of the embodiment shown.

Having described the invention what is claimed is:

1. In combination:

an annular thrust bearing;

an annular plastic magnet holder;

an annular magnet mounted in said annular plastic magnet holder;

the magnet holder having a recess with a predetermined configuration and the annular thrust bearing having an outside surface with a predetermined configuration;

said recess and said annular thrust bearing outside surface being configured to permit the plastic magnet holder to be snapped over said thrust bearing.

2. In combination:

an annular thrust bearing comprising;

a first thrust race having a radially extending annular portion;

a second thrust race having a radially extending annular portion axially separated from the radially extending portion of the first thrust race;

the radially extending annular portions having opposed radially extending annular raceways;

rolling members adapted to roll on the raceways;

an annular plastic magnet holder having an annular groove and a slot extending radially outwardly from said annular groove;

an annular magnet located within the annular groove and having an anti-rotation tab extending into the slot extending radially outwardly from the annular groove;

the annular groove and slot, and the annular magnet with its anti-rotation tab being configured to permit the magnet to be snapped into the plastic magnet holder and to prevent axial or rotational movement of the magnet with respect to the plastic magnet holder;

the plastic magnet holder having an annular radially inwardly extending spacer overlapping and contacting the backside of the first thrust race radially extending annular portion;

the plastic magnet holder having an annular recess formed by the annular radially inwardly extending spacer, an annular concave surface and an annular lip;

the axial length of the recess being substantially the same as the axial length of said thrust bearing;

said recess and the outside surface of said thrust bearing being configured to permit the plastic magnet holder to be snapped over said thrust bearing.

\* \* \* \* \*